United States Patent
Benthien et al.

(10) Patent No.: US 10,479,281 B2
(45) Date of Patent: Nov. 19, 2019

(54) EQUIPMENT MOUNTING DEVICE AND INSTALLATION ARRANGEMENT INCLUDING AN EQUIPMENT MOUNTING DEVICE

(71) Applicant: Airbus Operations GmbH, Hamburg (DE)

(72) Inventors: Hermann Benthien, Hamburg (DE); Marcus Hinrichs, Hamburg (DE); Michael Telkamp, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 122 days.

(21) Appl. No.: 15/672,742

(22) Filed: Aug. 9, 2017

(65) Prior Publication Data

US 2018/0043834 A1 Feb. 15, 2018

(30) Foreign Application Priority Data

Aug. 10, 2016 (EP) ..................... 16183592

(51) Int. Cl.
 B60R 7/08 (2006.01)
 F16B 5/06 (2006.01)
 (Continued)

(52) U.S. Cl.
 CPC .............. B60R 7/08 (2013.01); F16B 5/0621 (2013.01); B60R 2011/0052 (2013.01); F16B 5/0657 (2013.01); F16B 21/183 (2013.01)

(58) Field of Classification Search
 CPC .... F16B 5/0621; F16B 5/0657; F16B 21/183; F16B 2/243; B60R 7/08; B60R 2011/0052; B64C 1/403; Y10T 24/42; A47F 5/0823

(Continued)

(56) References Cited

U.S. PATENT DOCUMENTS 4,405,110 A * 9/1983 Gibbons ............... A47F 5/0823
 248/220.22
4,624,585 A * 11/1986 Nix ........................ B25B 27/28
 384/295

(Continued)

FOREIGN PATENT DOCUMENTS

DE 102008041230 2/2010
DE 102010038695 2/2012

OTHER PUBLICATIONS

European Search Report, dated Jan. 11, 2017, priority document.

*Primary Examiner* — Nathan J Newhouse
*Assistant Examiner* — Matthew T Theis
(74) *Attorney, Agent, or Firm* — Greer, Burns & Crain, Ltd.

(57) ABSTRACT

An equipment mounting device and an installation arrangement for mounting an equipment to two fittings. The mounting device comprises a longitudinal carrier configured to be coupled to the equipment, and sized to span a space between the two fittings. A first coupling is disposed at a first end of the longitudinal carrier. The first coupling is configured to be coupled with a first of the two fittings and, when coupled with the first fitting, to prevent movement of the carrier in a first direction different from a direction along a longitudinal axis of the longitudinal carrier. A second coupling is configured to detachably couple with a second of the two fittings by receiving a part of the second fitting and, when coupled with the second fitting, to prevent movement of the carrier at least in the first direction and the direction of the longitudinal axis of the carrier.

12 Claims, 8 Drawing Sheets

(51) Int. Cl.
*B60R 11/00* (2006.01)
*F16B 21/18* (2006.01)

(58) Field of Classification Search
USPC ............... 224/311, 666; 248/231.81, 220.22,
248/220.41; 24/453, 462, 464, 297, 540,
24/515, 516, 513, 504, 311, 313, 337,
24/333, 349, 336, 348, 503
See application file for complete search history.

(56) References Cited

U.S. PATENT DOCUMENTS

| | | | |
|---|---|---|---|
| 2003/0209632 A1* | 11/2003 | Hessling | B64C 1/066 |
| | | | 244/119 |
| 2011/0233359 A1* | 9/2011 | Rittner | B64C 1/403 |
| | | | 248/231.81 |
| 2012/0025024 A1 | 2/2012 | Robrecht et al. | |
| 2015/0125235 A1 | 5/2015 | Benthien et al. | |

* cited by examiner

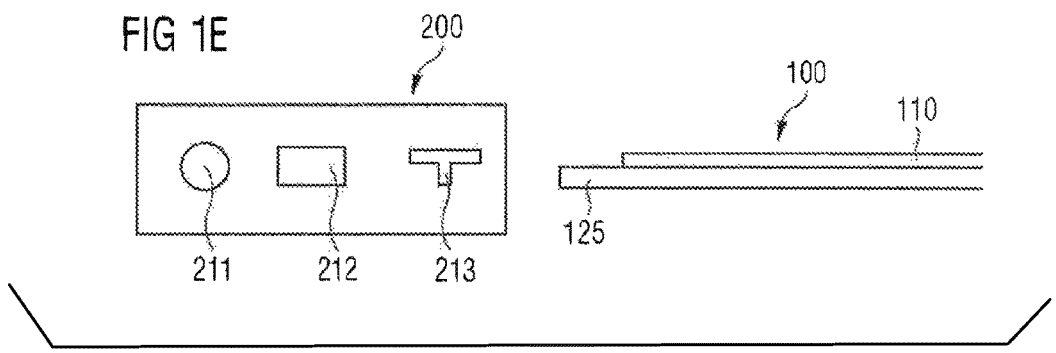

FIG 5B  A-A

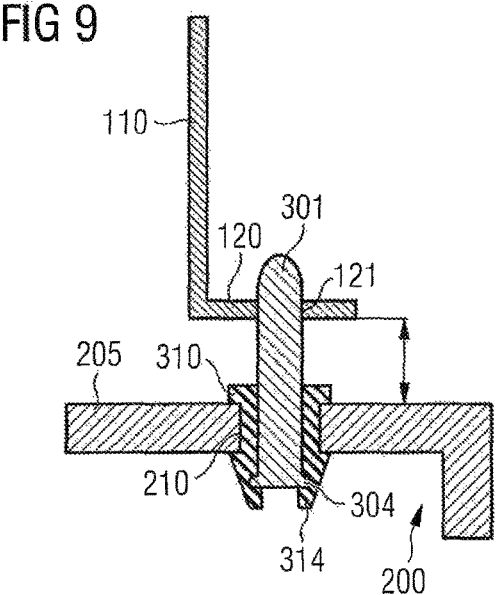
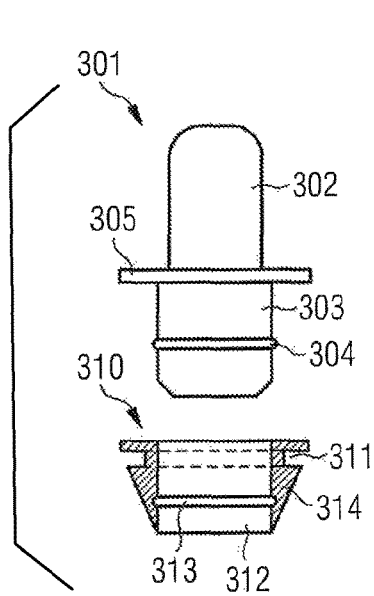
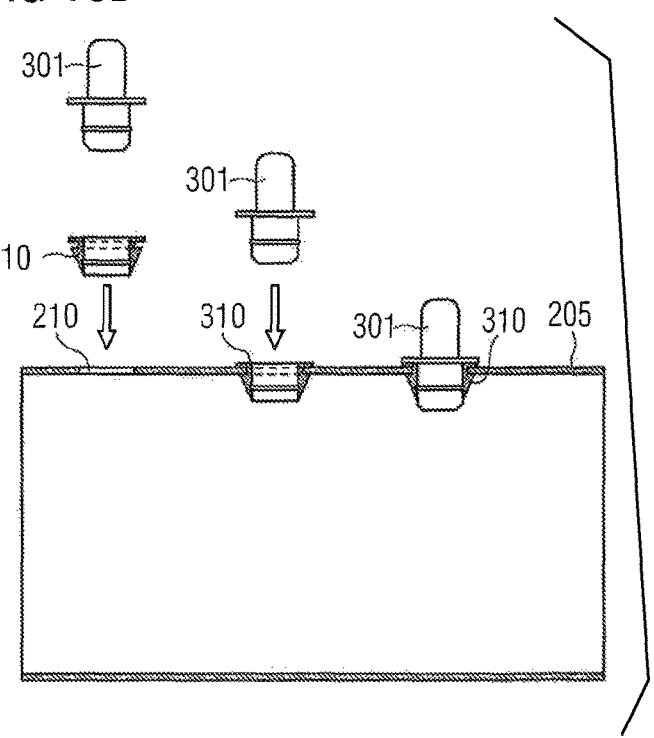

EQUIPMENT MOUNTING DEVICE AND INSTALLATION ARRANGEMENT INCLUDING AN EQUIPMENT MOUNTING DEVICE

CROSS-REFERENCES TO RELATED APPLICATIONS

This application claims the benefit of the European patent application No. 16183592.1 filed on Aug. 10, 2016, the entire disclosures of which are incorporated herein by way of reference.

BACKGROUND OF THE INVENTION

The present invention relates to an equipment mounting device for mounting an equipment to two fittings and an installation arrangement including such an equipment mounting device. In particular, the present invention relates to an equipment mounting device comprising a longitudinal carrier and two coupling means disposed at respective ends of the longitudinal carrier, and an installation arrangement comprising such an equipment mounting device for mounting an equipment housing to two fittings.

In a vehicle, various equipment has to be installed within an interior space of the vehicle. For instance, electrical equipment, control components, oxygen supply for aircraft passengers and similar devices are installed behind linings or ceiling elements of the vehicle. These devices are mounted to a structural component, such as an installation rail, using bolts, nuts, screws and/or similar fasteners.

However, in case of failure, maintenance or another reason to dismount such a device, it is cumbersome to open the fastener and release the device from the structural component. In addition, after removing a cover element of the lining or ceiling, the resulting opening available to reach such a device is usually small and makes it more difficult to dismount the fasteners.

SUMMARY OF THE INVENTION

Thus, it is an object of the present invention to provide an equipment mounting device that is easy and fast to install and to dismount.

According to an aspect, an equipment mounting device for mounting an equipment to two fittings in a vehicle comprises a longitudinal carrier, a first coupling means and a second coupling means. The longitudinal carrier is configured to be coupled to the equipment, and is sized to span a space between the two fittings. Spanning the space between the two fittings does not mean that the length of the longitudinal carrier is restricted to the exact distance between the two fittings. It is to be understood that the longitudinal carrier can have any length as long as the two coupling means can be coupled to the respective fittings. The vehicle can be any passenger vehicle, such as an aircraft, a train, a bus or a passenger ship/vessel. The equipment can be any device required in the vehicle, such as an electrical appliance, a control component, a sensor, an oxygen mask and/or supply for aircraft passengers or a similar device. This equipment is mounted to two fittings, which can be affixed to a primary structure of the vehicle. For example, one or more of the fittings can be an installation rail, which may run in a longitudinal direction of the vehicle. Such fitting (installation rail) allows mounting different appliances and components of the interior structure of the vehicle to the primary structure. In case of more than one installation rail, they can run parallel to each other.

Alternatively or additionally, one or more of the fittings can be a fitting directly mounted to or integrally formed with a part of the primary structure. For example, such fitting can be disposed at a frame element of the primary structure, such as a former, frame, stringer, intercostal, etc.

The longitudinal carrier can have any form and shape, such as a bar-type carrier. Alternatively, the longitudinal carrier may have at least a portion including a curvature. This allows the longitudinal carrier to circumscribe another device or element arranged between the fittings. The longitudinal carrier may further comprise elements for mounting the equipment thereto. For instance, the longitudinal carrier can be provided with one or more bores, protrusions, clips and/or fasteners to support and/or hold the equipment.

In order to span the space between the two fittings and also provide for a firm equipment mounting device, the longitudinal carrier may have a cross-section of a T-shape, I-shape, rectangular shape or circular shape. Furthermore, the longitudinal carrier can be sized to span a minimum distance between the two fittings. For example, if one or more of the fittings is an installation rail, the longitudinal carrier, when installed, is arranged substantially perpendicular to each of the two installation rails. Alternatively, the longitudinal carrier can be formed and sized, in order to bypass another equipment, component, etc. For instance, the longitudinal carrier can have a curved form. In case of installation rails, the longitudinal carrier can additionally or alternatively be arranged at an angle to the installation rails.

The first coupling means is disposed at a first end of the longitudinal carrier. The first coupling means can be formed integrally with the longitudinal carrier. Alternatively, the first coupling means can be affixed and rigidly fastened to the longitudinal carrier. Therefore, the first coupling means can be made of the same material as the longitudinal carrier or can be made of a different material. For instance, the longitudinal carrier as well as the first coupling means may be made of metal, plastic, and/or a composite material.

The first coupling means can be configured to be coupled to a first fitting of the two fittings. The first coupling means can be configured, when coupled with the first fitting, to prevent movement of the longitudinal carrier in a first direction different from a direction along or parallel to a longitudinal axis of the longitudinal carrier. For example, the first coupling means provides two degrees of freedom for movement of the longitudinal carrier along two directions including the direction along or parallel to the longitudinal axis. Additionally, the first coupling means can provide three degrees of freedom with respect to momentums.

The second coupling means is configured to detachably couple with a second fitting of the two fittings by receiving a part of the second fitting. The second coupling means is configured, when coupled with the second fitting, to prevent movement of the longitudinal carrier at least in the first direction different from the direction along or parallel to the longitudinal axis of the longitudinal carrier and the direction of the longitudinal axis of the longitudinal carrier. By receiving a part of the second fitting the second coupling means can transfer forces. For example, forces in the direction along or parallel to the longitudinal axis of the longitudinal carrier can be transferred to the second fitting via contacting surfaces of the second coupling means and the second fitting. Optionally, a momentum from the longitudinal carrier into the second fitting can be transferred from the second coupling means to the second fitting by receiving a part of the second fitting.

The second coupling means provides less degrees of freedom with respect to forces (loads) and momentum(s) than the first coupling means at an opposite end of the longitudinal carrier.

The second coupling means can be made of the same material as the longitudinal carrier or can be made of a different material. For instance, the longitudinal carrier as well as the second coupling means may be integrally formed or are separate elements and can each be made of metal, plastic, and/or a composite material.

For example, the equipment mounting device can be made by injection molding or press molding.

Due to the provision of the first and second coupling means, the equipment mounting device can be easily mounted to the first and second fittings. For instance, the first coupling means is first coupled to the first fitting, while a movement along or parallel to the longitudinal axis of the longitudinal carrier is still possible (at least to a certain extent, e.g., until the longitudinal carrier abuts against the first fitting or another element in the vicinity of the first fitting). At this time, the equipment mounting device is held at one end (i.e., prevented from moving in the first direction different from the direction along or parallel to the longitudinal axis of the longitudinal carrier). Furthermore, in the held position the second coupling means can be kept at a distance from the second fitting. Subsequently the equipment mounting device can be rotated around a pivot point formed at the first coupling means and the first fitting. Due to the pivotal movement, the second coupling means comes into engagement with the second fitting and can be coupled to the second fitting. Thus, the equipment mounting device is affixed to the first and second fittings in an easy and fast manner Similarly, dismounting the equipment mounting device can be easily achieved by releasing the detachable coupling between the second coupling means and the second fitting, disengaging the second coupling means from the second fitting by pivoting the equipment mounting device around the pivot point at the first coupling means and disengaging the first coupling means from the first fitting.

This form of mounting and dismounting of the equipment mounting device provides the advantage that any equipment can be replaced or repaired or maintenance can be performed in a fast manner. Thus, the time that the vehicle cannot be used is significantly reduced. For example, in case of an aircraft, train, bus or ship, the turnaround time during which the vehicle waits at an airport, train station, terminal or port can be reduced (e.g., down to 15 minutes or less) and costs of the vehicle operator can be reduced.

According to an implementation variant, the second coupling means can include a first protruding part protruding from the longitudinal carrier at an angle with respect to the longitudinal axis of the longitudinal carrier, and a second protruding part forming a clip. The second coupling means can be configured for receiving the part of the second fitting between the first protruding part and the second protruding part. The second coupling means, and, in particular, one or both of the first and second protruding parts, together with the longitudinal carrier form a bracket to couple the equipment mounting device to the second fitting.

The second coupling means, and, in particular, the first and second protruding parts, can extend from the longitudinal carrier at any angle required for attachment to the second fitting. For example, the second coupling means may be arranged perpendicularly to the longitudinal direction of the longitudinal carrier. Alternatively, the second coupling means may be arranged at an angle other than 90°, in order to compensate for any inclined arrangement of the longitudinal carrier with respect to a portion of the second fitting, to which the second coupling means aligns.

The first and second protruding parts can run parallel to each other and may be spaced apart from each other to form a space into which the part of the second fitting fits. Thus, the first and second protruding part can form a close-fit to receive the part of the second fitting. Furthermore, the first and second protruding parts can protrude from the longitudinal carrier to any required extend. For instance, the first protruding part can extend in as much that it provides a sufficient contact surface contacting the part of the second fitting, so that any forces and momentum from the equipment mounting device can be transferred into the second fitting. For instance, a movement of the longitudinal carrier in the direction of the longitudinal axis of the longitudinal carrier is prevented Similarly, the second protruding part can extend in as much that it also provides a sufficient contact surface contacting a surface of the part of the second fitting opposite to the surface contacted by the first protruding part. The second protruding part can also prevent a movement of the longitudinal carrier in the direction of the longitudinal axis of the longitudinal carrier. In addition, the second protruding part may be shorter or longer in the extending direction than the first protruding part. For example, the second protruding part may extend from the longitudinal carrier in as much that a detachable coupling of the second coupling means to the second fitting is ensured.

In order to provide for the detachable coupling of the second coupling means to the second fitting, the second protruding part can include a lug configured for engaging into an opening of the second fitting. The lug is a protrusion provided at the surface of the second protruding part facing the part of second fitting, with which the second coupling means is coupled. Therefore, the lug extends into the direction towards the first protruding portion. The lug may be a ball-shaped, cylindrical and/or cubicle protrusion capable of engaging with the opening of the second fitting. This structure of the second coupling means provides for a clip-like coupling of the second coupling means to the part of the second fitting. In order to allow the lug engaging and disengaging the opening of the second fitting, the second protruding part is elastically deformable. Advantageously, the second protruding part, when in a normal state (resting state), aligns with the part of the second fitting and the lug engages with the opening of the second fitting.

Alternatively, in order to provide for the detachable coupling, the second coupling means includes an opening, bore, recess or hole that is configured to engage with a lug of the second fitting. For example, the second protruding part includes an opening, bore, recess or hole configured for engaging with a lug of the second fitting. The lug can be a protrusion provided at a surface of the second fitting facing the second protruding part. Therefore, the lug extends into the direction towards the first protruding part when the second coupling means is coupled to the second fitting. The lug may be a ball-shaped, cylindrical and/or cubicle protrusion and the opening of the second protruding part is configured to encompass the lug of the second fitting.

Such structure of the second coupling means provides for a clip-like coupling of the second coupling means to the part of the second fitting. In order to allow the second protruding part engaging and disengaging the lug of the second fitting, the second protruding part is elastically deformable. Advantageously, the second protruding part, when in a normal state (resting state), aligns with the part of the second fitting and the opening, bore, recess or hole encompasses the lug of the second fitting.

Furthermore, in view of an implementation variant, the second coupling means can include a lever configured for bending the second protruding part to disengage the clip-like second protruding part from the second fitting. Thus, the lever is provided at the second coupling means, so that a first part of the lever is coupled with the second protruding part, while a second part of the lever provides a lever arm for bending the second protruding part if a force is exerted onto the lever arm. Thereby the lug or opening, bore, recess or hole at the second protruding part disengages from the opening or the lug of second fitting.

For example, the lever can extend from a distal end of the second protruding part and form an acute angle with the second protruding part. The distal end of the second protruding part is a portion of the second protruding part having the maximum extent (distance) from the longitudinal carrier. If the lever is attached to the distal end of the second protruding part, it can bend the second protruding part more easily, since the entire extension (length) of the second protruding part can be used as a lever arm by the bending movement applied by the lever.

Since the lever is provided at an acute angle with respect to the second protruding part, the lever can easily bend the second protruding part if the lever performs a pivoting movement. To this end, the lever can include a strut contacting the second coupling means at a proximal end of the second protruding part to create a pivotal point of the lever. The strut may protrude from the lever in the direction of the second protruding part, i.e., forming a side of a triangle opposite the acute angle between the lever and the second protruding part. In order to pivot the lever around the contacting point of the strut, the lever extends from the distal end of the second protruding part to the strut and further away from the distal end of the second protruding part, i.e., the lever is longer than the distance between the distal end of the second protruding part and the strut.

Alternatively or additionally, the lever can extend from a proximal end of the second protruding part. In this case, a contacting point of the lever and the second protruding part forms a pivoting point of the lever and second protruding part. This contacting point can also be a contacting point of the second protruding part with the longitudinal carrier. Thus, if a force is exerted onto the lever, the lever and second protruding part pivot around their contacting point, so that the distal end of the second protruding part can lift, thereby disengaging the second coupling means from the second fitting.

According to a further implementation variant, the lever can include a bend or kink. Such bend or kink allows arranging a distal end (free end) of the lever at a position that can be easier reached for disengaging the second coupling means from the second fitting. For example, if installations surrounding the mounted equipment mounting device at the second coupling means may block access to the area of the second protruding part, it may be cumbersome to reach the lever when disengaging the second coupling means from the second fitting. Thus, by providing a bend in the lever, a distal end of the lever can be in an area not blocked by the installations.

According to a further implementation variant, the second protruding part can include a visual indicator indicating that the lug is not engaged into the opening of the second fitting or indicating that the opening of the second protruding part does not encompass (engage with) the lug of the second fitting. Such a visual indicator can be a strut extending from the lever. For example, the visual indicator may extend opposite from the strut providing a pivoting point of the lever, but can be disposed at any other part of the lever. When the equipment mounting device, and, in particular, the second coupling means, is not fully coupled to the second fitting, the lug of the second protruding part lies on a part of the second fitting before engaging with the opening of the second fitting or the second protruding part lies on the lug of the second fitting before the opening of the second protruding part engages with (encompasses) the lug of the second fitting. This implies a bending of the second protruding part and, hence, the lever. The visual indicator (strut) can be arranged at the second protruding part and extend therefrom in as much that the strut is visible, thereby indicating that the lug is not (yet) engaging with the opening. When the lug engages with the opening, the second protruding part and lever will move accordingly. Thereby, the lever covers the visual indicator (strut), so that the visual indicator is not visible.

Alternatively, the visual indicator may be an element protruding from the lug at the second protruding part that pierces through the opening of the second fitting or protruding from the lug at the second fitting that pierces through the opening of the second protruding part. Thus, such visual indicator can be visible on the side of the second fitting where the first protruding part of the second coupling means is disposed or can be visible on the side of the second protruding part facing away from the second fitting.

According to yet another implementation variant, the second coupling means can have an interior form matching an exterior form of the part of the second fitting received by the second coupling means. The interior form of the second coupling means, means the form of the portion of the second coupling means delimited at least by the first and second protruding parts.

For example, a free edge of the second fitting (e.g., a leg of an installation rail forming the second fitting) may be provided with a certain shape, such as a scalloping form. The face side of the portion of the second coupling means delimited by the first and second protruding parts or a part thereof can have a corresponding matching scalloping form. This allows affixing the second coupling means to the second fitting with the lug at the second protruding part, while forces exerted onto the second coupling means along at least one direction different from the longitudinal direction of the longitudinal carrier can be transferred to the second fitting via the interior form of the second coupling means and the corresponding exterior form of the second fitting.

In addition or alternatively, the surfaces of the first and/or second protruding part of the second coupling means facing each other may not be flush, but can be provided with one or more protrusions, dents, embossments, etc. At least one side surface of the part of the second fitting facing the first or second protruding part after coupling the second coupling means with the second fitting can have mating one or more protrusions, dents, embossments etc. Thus, the second coupling means when coupled with the second fitting is capable of transferring forces in the at least one direction different from the longitudinal direction of the longitudinal carrier as well as in the longitudinal direction of the longitudinal carrier.

The latter implementation variant having one or more protrusions, dents, embossments, etc. at the first and/or second protruding parts also allows omitting the lug at the second protruding part of the second coupling means. In this case, the one or more protrusions, dents, embossments, etc. function as a detachable coupling element of the second coupling means.

According to a further implementation variant, the first coupling means can include a plug-and-socket connection. Such plug-and-socket connection can be achieved in various ways. For example, the plug-and-socket connection can include a pin coupled with an opening in the first fitting and/or coupled with an opening in the first coupling means.

For instance, the first coupling means can include a protruding part protruding from the longitudinal carrier. The protruding part can include an opening, bore, recess or hole. Furthermore, the first fitting may include a protruding element, such as a pin, bolt or strut that extends from the first fitting into a direction from which the equipment mounting device is to be coupled to the first fitting.

The opening, bore, recess or hole of the protruding part of the first coupling means can be configured to receive the protruding element of the first fitting. The protruding part of the first coupling means may have a plate shape (rectangular, elliptical or circular), where the opening, bore, recess or hole is provided. Alternatively, the protruding part can be a stud with a loop or only a loop, where the loop is capable of receiving the protruding element of the first fitting. In any case, the first coupling means detachably holds the equipment mounting device to the protruding element of the first fitting. Also alternatively, the first fitting can include at least one lug extending from at least one surface. The lug is configured to fit into the opening, bore, recess or hole of the first coupling means, so that the first coupling means detachably holds the equipment mounting device to the lug at the first fitting when the opening, bore, recess or hole encompasses the lug.

According to a further implementation, the first coupling means is configured to be coupled with the first fitting by a protruding element, such as a pin, bolt or strut that extends from the first coupling means. This protruding element of the first coupling means can be configured to be inserted into an opening of the first fitting. To this end the first coupling means can include a protruding part protruding from the longitudinal carrier. The protruding element of the first coupling means can extend from the protruding part. For example, the protruding element of the first coupling means can project away from the protruding part substantially perpendicular thereto (or at an angle different than 90°). Furthermore, the protruding element of the first coupling means can extend in a direction towards the first fitting. Additionally or alternatively, the protruding part can have an opening, bore, recess or hole configured to hold the protruding element of the first coupling means. For instance, the protruding element of the first coupling means can be mounted into the opening, bore, recess or hole, e.g., using a bushing, thread or a thread/nut arrangement. The protruding part may have a plate shape (rectangular, elliptically or circular), where the opening, bore, recess or hole is provided to hold the protruding element of the first coupling means or from which the protruding element of the first coupling means projects. Alternatively, the protruding part can be a stud with a loop or only a loop, where the loop is capable of holding the protruding element of the first coupling means. In any case, the first coupling means detachably holds the equipment mounting device to the first fitting by inserting the protruding element of the first coupling means into an opening of the first fitting.

In addition or alternatively, the first coupling means can include only a protruding part that projects from the longitudinal carrier into the direction, where the first fitting will be coupled. In order to achieve a detachably coupling of the first coupling means with the first fitting, the first fitting includes an opening, bore, recess or hole. The shape of the protruding part of the first coupling means corresponds the shape of the opening, bore, recess or hole of the first fitting. For example, a cross-section of the protruding part of the first coupling means may have a circular, elliptical, rectangular or polygonal shape, such as an I-shape or T-shape. The opening, bore, recess or hole of the first fitting is provided with a corresponding shape, so that the protruding part of the first coupling means can be inserted into the opening, bore, recess or hole of the first fitting.

The protruding part of the first coupling means can extend from the longitudinal carrier at any angle required for attachment to the first fitting. For example, the protruding part of the first coupling means, when coupled to the first fitting using a plug-and-socket connection, may be arranged perpendicularly to a longitudinal direction of the longitudinal carrier. Alternatively, the protruding part of the first coupling means may be arranged at an angle other than 90°, in order to compensate for any inclined arrangement of the longitudinal carrier with respect to a portion of the first fitting, to which the first coupling means aligns. In case the first coupling means is coupled to the first fitting solely by the protruding part, the protruding part may extend from the longitudinal carrier at any angle required for attachment to the first fitting. For example, the protruding part may extend in the longitudinal direction of the longitudinal carrier or at an angle thereto.

According to another aspect, an installation arrangement comprises at least two fittings, an equipment housing, and at least one equipment mounting device according to the above aspect without any or with one or more of the explained implementation variants and alternatives. Each of the at least one equipment mounting device is coupled to a respective one of the fittings at a respective end of the equipment mounting device. Thereby, one end is coupled to a fitting using a first coupling means, according to a variant explained above, while the other end is coupled to another fitting using a (clip-like) bracket, i.e., the second coupling means.

One or more of the fittings can be a fitting directly mounted to or integrally formed with a part of the primary structure. For example, such fitting can be disposed at a frame element of the primary structure, such as a former, frame, stringer, intercostal, etc. In case of a plug-and-socket connection of the first coupling means, the fitting may only include an element having an opening, bore, recess or hole to receive the protruding part of the first coupling means. Alternatively, the primary structure may include such opening, bore, recess or hole, so that the fitting is achieved by only providing such opening, bore, recess or hole.

Alternatively or additionally, at least one of the (at least two) fittings can be an installation rail. Such installation rail can be affixed to a primary structure of the vehicle. An installation rail allows mounting different appliances and components of the interior structure of the vehicle to the primary structure. The installation rail can have a form that is comparable to the form of a single fitting repeated at predefined intervals along a longitudinal direction of the installation rail. For example, the installation rail may have a plurality of openings and/or a plurality of protruding parts (e.g., pins) along the longitudinal direction of the installation rail allowing the coupling of one or more equipment mounting devices with a respective first coupling means having a protruding part and/or an opening, respectively Similarly, an installation rail can have plurality of lugs and/or openings along the longitudinal direction of the installation rail allowing the coupling of one or more equipment mounting devices with a respective second coupling means having an opening or lug.

Furthermore, an installation rail may run in a longitudinal direction of the vehicle. In case of more than one installation rail, the installation rails can run parallel to each other. In any case, the equipment mounting device can be dimensioned to span a space between the two installation rails.

The equipment housing is capable of surrounding the equipment. Thus, the equipment housing is dimensioned to hold any device required in the vehicle, such as an electrical appliance, a control component, a sensor, an oxygen mask and/or supply for vehicle passengers or similar device. The equipment housing may include any fastening means to affix the equipment to the housing.

Furthermore, the equipment housing can be configured to be coupled to the at least one equipment mounting device. For example, the equipment housing may include one or more bores, protrusions, clips and/or fasteners to be coupled to the equipment mounting device(s).

In case of employing multiple equipment mounting devices to mount one equipment housing, the equipment housing may have any desired size. Furthermore, the installation arrangement becomes more stable, since a momentum generated by the equipment housing can be transformed into (almost) linear forces transferred from the multiple equipment mounting devices into the fittings. For example, an equipment housing can be installed with two equipment mounting devices. Although four bearings are achieved for such installation arrangement (one at each end of each equipment mounting device), the first coupling means provide for sufficient movability of the equipment mounting devices to avoid constraints. In addition, even if one of the first or second coupling means fails, the installation arrangement is still securely held at three points.

Furthermore, a fitting in the form of an installation rail can have a U-shaped cross-sectional profile, an H-shaped cross-sectional profile or an I-shaped cross-sectional profile. In any case, the installation rail is arranged so that a leg of the cross-sectional profile extends into the direction from which the at least one equipment mounting device is installed.

According to an implementation variant, a leg of at least one of the installation rails is provided with at least one opening. The leg may extend into the direction from which the at least one equipment mounting device is installed. At least one of the openings can be configured to be coupled with a protruding part of the first coupling means of the equipment mounting device and/or to receive a lug of a second coupling means of the equipment mounting device.

Furthermore, a leg of at least one of the installation rails can have a scalloping profile in a longitudinal direction of the installation rail. Such scalloping profile is achieved, for example, by grinding a free end of the leg to a varying extent changing along the longitudinal direction of the installation rail.

According to a further implementation variant, the installation arrangement can further comprise a bushing inserted into an opening of one of the fittings, and a pin inserted into the bushing. Alternatively, the pin is directly inserted into the opening. This provides for coupling the at least one equipment mounting device to the pin at one end of the equipment mounting device.

Alternatively, a first coupling means of the equipment mounting device can further comprise an opening into which a bushing can be inserted. The installation arrangement further comprises a pin inserted into the bushing and at least one fitting including an opening capable of receiving the pin. Alternatively, the pin is directly mounted to the opening of the first coupling means or is integrally formed with the first coupling means. All of this provides for the at least one equipment mounting device to be coupled to a fitting and to prevent movement of the equipment mounting device in a first direction different from a direction along a longitudinal axis of the equipment mounting device (or a longitudinal carrier thereof).

Furthermore, in any case the bushing can include a securing element securing the bushing from disengaging from the opening of the fitting or the first coupling means of the equipment mounting device. For example, the bushing can include a through hole, and the securing element can include a bushing part configured to abut against the fitting surrounding its opening or to abut against the first coupling means surrounding its opening. The bushing part may form a bulge or ridge at at least one end of the bushing, so that the bulge or ridge engages with an area surrounding the respective opening. If a bulge and/or ridge is provided on both sides (ends) of the bushing, i.e., on both sides of the opening, the bushing is secured inside the opening, since each bulge/ridge abuts against the surface of the fitting or of the first coupling means surrounding the respective opening. The bulge or ridge on both sides of the bushing can be achieved by providing a recess circumferentially disposed on an outer surface of the bushing.

In addition, a circumferentially arranged groove can be provided in the through hole at the bushing part abutting against the fitting or the first coupling means. The groove may be provided at an inner surface of the bushing in an area of the bulge or ridge. The pin can then include an activator activating the securing element when inserted into the bushing and securing the pin from disengaging from the bushing. For example, the pin may comprise a bulge or ridge configured to engage with the groove provided in the bushing. Thus, when the pin is inserted into the bushing, the bulge or ridge of the pin provides a support to the inner surface of the bushing preventing the bulge or ridge of the bushing from being pressed in as much that it could fit through the opening. Therefore, when the pin is inserted into the bushing, the bulge or ridge of the pin, in combination with the bulge or ridge of the bushing, secure the pin and bushing within the opening.

Alternatively, only the pin is provided with a bulge or ridge, e.g., circumferentially arranged around an outer surface of the pin. When such pin is inserted into the bushing, the bulge or ridge of the pin presses the bushing to the outside, thereby preventing the bushing from fitting through the opening of the fitting or the first coupling means. Thus, the bushing is squeezed to the outside and can have a greater cross-sectional size than the cross-sectional size of the opening, thereby securing the bushing in the opening.

BRIEF DESCRIPTION OF THE DRAWINGS

Preferred embodiments of an equipment mounting device and an installation arrangement are described in greater detail with reference to the attached schematic drawings in the following, wherein FIG. 1E shows a side view of an equipment mounting device with a variant of a first coupling means, FIG. 9 shows a sectional view of a first coupling means and a pin arrangement at a fitting, and FIGS. 10A and 10B show a sectional view of a pin and bushing, and a sequence of installing a bushing and pin to a fitting, respectively.

DETAILED DESCRIPTION OF THE PREFERRED EMBODIMENTS

The following detailed description of the schematic drawings focuses on the illustrated implementation variants of an equipment mounting device and an installation arrangement. The present disclosure is not limited to the above and below described and illustrated equipment mounting devices and installation arrangements, but includes combinations of the described variants and implementation details of these equipment mounting devices and installation arrangements.

Figure 1A:
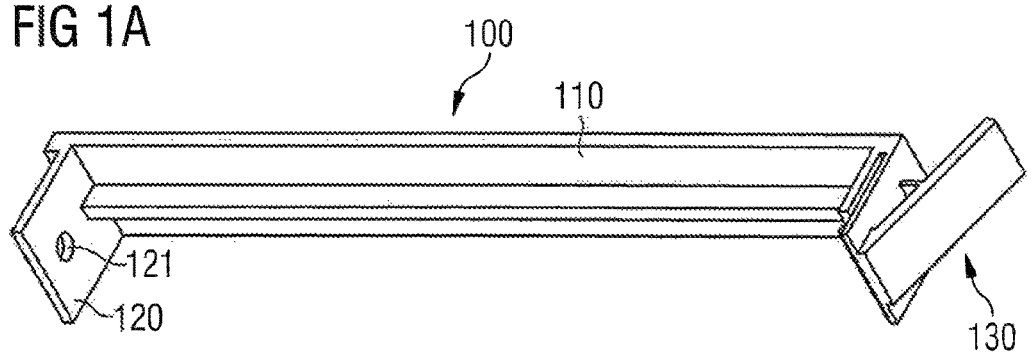
FIGS. 1A to 1D show a perspective view, side view, top view and bottom view of an equipment mounting device, respectively.
Figure 1B:
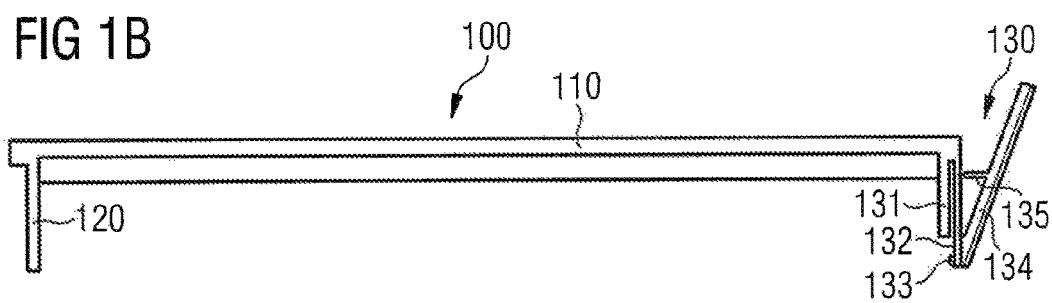
Figure 1C:
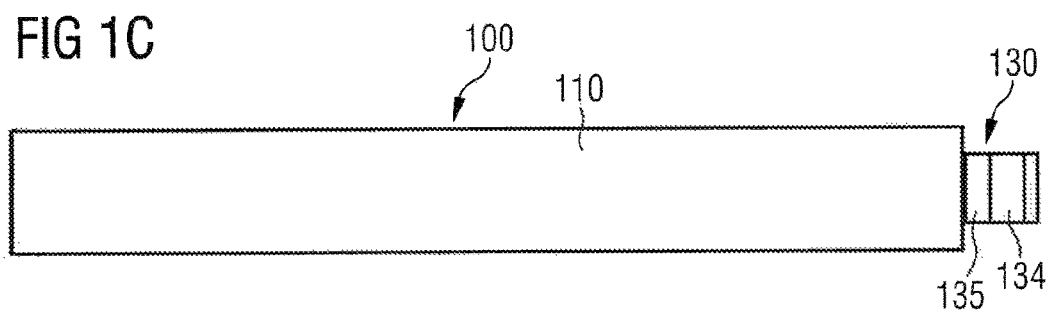
Figure 1D:
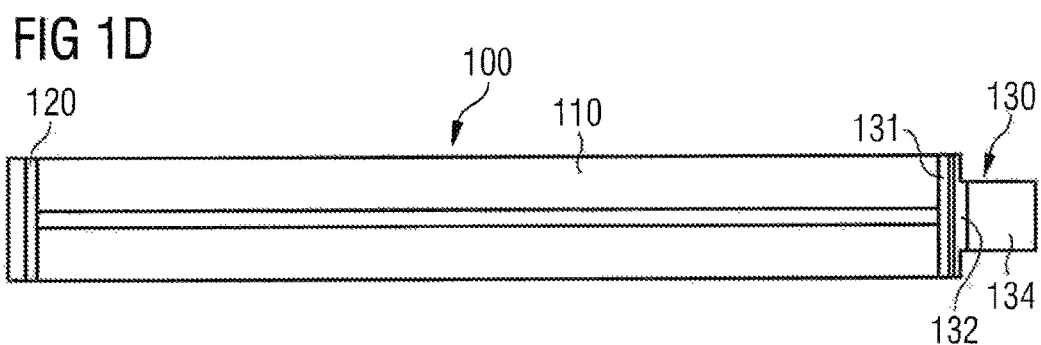

FIGS. 1A to 1D show different views of an equipment mounting device 100. In particular, FIG. 1A shows a perspective (three-dimensional) view of the equipment mounting device 100, while FIG. 1B shows a side view, FIG. 1C shows a top view, and FIG. 1D shows a bottom view of the equipment mounting device 100.

The equipment mounting device 100 includes a longitudinal carrier 110 that is configured to be coupled to an equipment (not shown in FIGS. 1A-1D). The length of the longitudinal carrier 110 is sized to span a space between two fittings as will be outlined in more detail further below. The longitudinal carrier 110 is illustrated as having a T-shaped cross-section, where the horizontal part (see FIG. 1C) is wider than the vertical extent of the vertical part (see FIG. 1B). It is to be understood that the vertical part may be larger and that the longitudinal carrier may have any cross-sectional profile, such as an I-shaped, rectangular or circular cross-section.

Disposed at one end of the longitudinal carrier 110 is a first coupling means 120 configured to be coupled with a protruding part of a fitting (not shown in FIGS. 1A-1D). For example, the protruding part of the fitting can extend from the first one of the two fittings or can extend from the first coupling means 120. The first coupling means include a protruding part 120 as illustrated that extends at an angle from the longitudinal carrier 110. In case the two fittings are installation rails arranged parallel to each other and at the same level, the protruding part 120 of the first coupling means may be perpendicularly arranged with respect to the longitudinal carrier. Otherwise, the protruding part 120 of the first coupling means may be arranged at an angle different from 90° with respect to the longitudinal direction of the longitudinal carrier. This applies to both directions perpendicular to the longitudinal axis of the longitudinal carrier 110, so that the longitudinal carrier 110 can be arranged at any angle with respect to the first fitting.

In order to couple the first coupling means 120 with the first fitting, the protruding part 120 of the first coupling means is provided with an opening 121. The opening 121 may be a hole, bore or recess of circular, rectangular, elliptical or other cross-sectional form. The opening 121 should be sized to be capable of receiving the protruding part of the first fitting. If the protruding part of the first fitting extends from the first fitting, it will be inserted into the opening 121 from the outside of the equipment mounting device 100, i.e., from the left of each of FIGS. 1A to 1D. In case the protruding part of the first fitting is mounted to the first coupling means 120, the protruding part can be inserted into the opening 121 for mounting it therein from either side.

FIG. 1E illustrates, on the right side of the drawing, another form first coupling means 125 at an end of the longitudinal carrier 110 of the equipment mounting device 100. This first coupling means 125 extends or projects from an end of the longitudinal carrier 110 in a direction along or parallel to the longitudinal axis of the longitudinal carrier 110. For example, the first coupling means 125 may be an extension of a portion of the longitudinal carrier. FIG. 1E shows a bottom part of the longitudinal carrier 110 being longer than an upper part of the longitudinal carrier 110.

It is to be understood that the first coupling means 125 can project from an end of the longitudinal carrier 110 at an angle with respect to the longitudinal axis of the longitudinal carrier. This allows compensating any inclination between the first fitting and the longitudinal carrier 110. Furthermore, the first coupling means 125 may be attached to the longitudinal carrier 110 or may be formed integrally with the longitudinal carrier 110.

On the left side of FIG. 1E a side view of a first fitting 200 is shown, where different (alternative) forms for coupling with the first coupling means 125 are illustrated. In order to detachably couple to the equipment mounting device 100 to the first fitting 200, the first fitting 200 is provided with an opening, bore, recess or hole having a form corresponding to the shape of the first coupling means 125. For example, in case the first coupling means 125 has a circular cross-section, the first fitting 200 is provided with a circular opening, bore, recess or hole 211. Similarly, if the first coupling means 125 has a rectangular cross-sectional shape, the first fitting 200 also includes a rectangular opening, bore, recess or hole 212.

In accordance with another example, the first coupling means 125 may have the same cross-sectional shape as the longitudinal carrier 110. In this case, the opening, bore, recess or hole 213 of the first fitting 200 will have a corresponding shape, such as the T-shape illustrated in FIG. 1E. It is to be understood that the first coupling means 125 and the opening, bore, recess or hole 211, 212, 213 of the first fitting 200 may have any cross-sectional shape and form, respectively, including polygonal shape and form. The matching shape and form of the first coupling means 125 and the first fitting 200 allows a movement of the longitudinal carrier in a direction along or parallel to the longitudinal axes of the longitudinal carrier 110, but prevents the movement in a different direction.

Disposed at an opposite end of the longitudinal carrier 110 is a second coupling means 130 configured for receiving a part of a second fitting (not shown in FIGS. 1A-E). To achieve this coupling between the second coupling means 130 and the second fitting, the second coupling means 130 includes a first protruding part 131 and a second protruding part 132. As with the first coupling means 120, the first and second protruding parts 131, 132 of the second coupling means 130 protrude from the longitudinal carrier 110 at any angle with respect to a longitudinal axis of the longitudinal carrier 110.

A space between the first and second protruding parts 131, 132 is sized to receive the part of the second fitting. Thus, the first and second protruding parts 131, 132 are spaced apart from each other to an extent corresponding to the thickness of the part of the second fitting received therein.

The second coupling means 130 may further include a lug 133, a lever 134 and a strut 135, the functionality of which will be explained in more detail with respect to FIGS. 3 and 6A-C to 8A-B. Instead of a lug 133, the second coupling means 130 can include an opening, recess, bore or hole (not shown) as will also be explained in more detail with respect to FIGS. 3, 5 and 6A-C to 8A-B.

The first coupling means 120 and the second coupling means 130 can be coupled to a respective fitting. One or more of the fittings 200 can be a fitting directly mounted to or integrally formed with a part of the primary structure (not shown) of the vehicle. For example, such fitting 200 can be disposed at a frame element of the primary structure, such as a former, frame, stringer, intercostal, etc.

Alternatively or additionally, at least one of the fittings 200 can be an installation rail as illustrated in FIGS. 2A-C, 3, 5A-C and 10A-B. Such installation rail 200 can be affixed to a primary structure of the vehicle as with any other fitting. Thus, an installation rail 200 provides an interface for mounting different appliances and components of the interior structure of the vehicle to the primary structure. The installation rail 200 can have a form that is comparable to the form of a single fitting repeated at predefined intervals along a longitudinal direction of the installation rail 200. In other words, the installation rail 200 can be a concatenation of a plurality of single fittings.

Thus, in the present disclosure, the properties of a fitting are the same as those of an installation rail 200. The installation rail 200 provides a plurality of attachment points along a longitudinal direction of the installation rail 200, i.e., constitutes a plurality of single fittings. A single fitting 200 provides a single attachment point for an equipment mounting device 100.

Therefore, it is to be understood that any explanation provided for an installation rail 200 is also applicable for a fitting and vice versa. The terms "fitting" and "installation rail" can therefore be exchanged throughout the present disclosure.

Figure 2A:
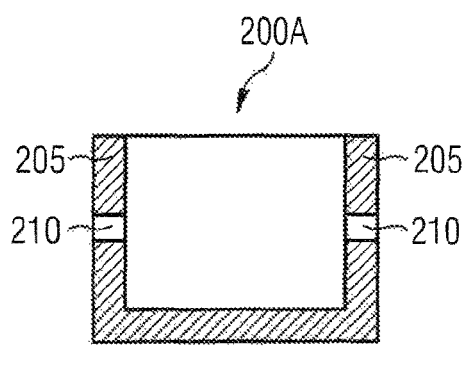
FIGS. 2A to 2C show cross-sectional profiles of different fittings in the form of installation rails.
Figure 2B:
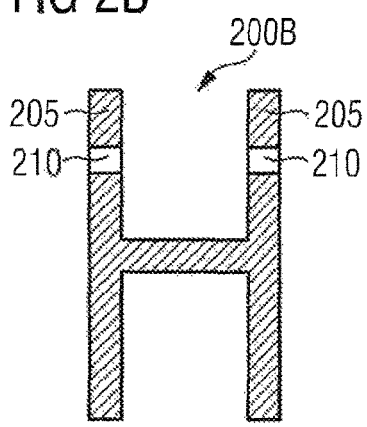
Figure 2C:
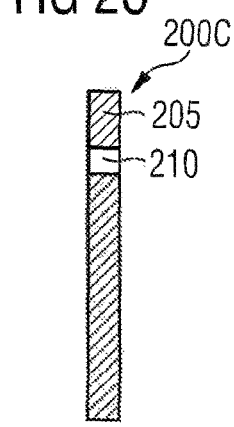

FIGS. 2A to 2C show cross-sectional profiles of different fittings, e.g., installation rails 200. According to FIG. 2A, an installation rail 200A may have a U-shaped cross-sectional profile. This U-shaped installation rail 200A comprises two legs 205, each of which can be configured for coupling with the first coupling means 120 and/or the second coupling means 130 of the equipment mounting device 100. To this end, one or both legs of the installation rail 200A may be provided with an opening 210 (e.g., opening 211, 212, 213 of FIG. 1E).

Alternatively, the installation rail 200 may have an H-shaped cross-sectional profile as illustrated in FIG. 2B. As with the installation rail 200A shown in FIG. 2A, the H-shaped installation rail 200B also includes two legs 205, one or both of which can include an opening 210.

According to a further alternative, an installation rail 200C as illustrated in FIG. 2C may have an I-shaped cross-sectional profile. Therefore, the installation rail 200C includes only one leg 205, which is provided with an opening 210.

The installation rails 200 can be standardized for one vehicle. For example, each installation rail 200 can include a plurality of openings 210 at predefined intervals. This allows installing an equipment mounting device 100 at any of these openings 210 and, hence, at any desired/required position along the longitudinal direction of the installation rail 200. A pair of installation rails 200 may be arranged parallel to each other and with an opening 210 of one installation rail 200 being aligned with an opening 210 of the other installation rail 200.

Figure 3:
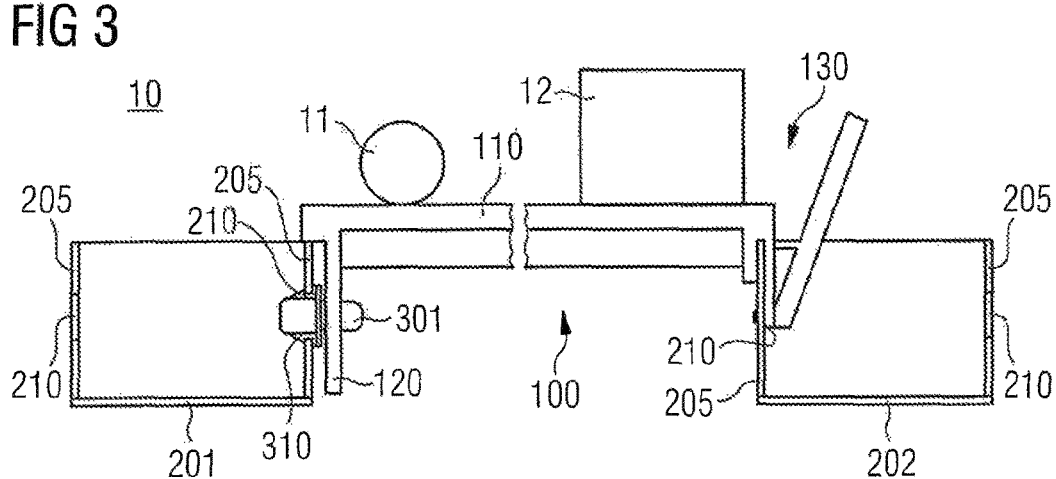
FIG. 3 shows a side view of an installation arrangement including fittings (installation rails), equipment housings and an equipment mounting device.

The equipment mounting device 100 of the present disclosure can be coupled to any of these installation rails 200. For example, FIG. 3 shows a side view of an installation arrangement 10 including two fittings, e.g., installation rails 201 and 202, having a U-shaped cross-section, one or more equipment housings 11, 12 and an equipment mounting device 100. FIG. 3 shows the installation arrangement 10, where the equipment mounting device 100 is mounted to the installation rails 200 from the top, resulting in an equipment mounting device 100 lying on one installation rail 202 (on the right-hand side of FIG. 3).

It is to be noted that at least one of the installation rails 200, e.g., installation rail 202 at the second coupling means 130, may be arranged upside down, so that their respective legs 205 point downwards and the equipment mounting device 100 is installed from the bottom of FIG. 3 resulting in a hanging equipment mounting device 100. This (hanging) installation arrangement 10 is advantageous in case it is installed at a ceiling of the vehicle. For example, the installation arrangement 10 may be disposed behind (i.e., above) a ceiling panel. The installation rail(s) 200 can then be installed at a ceiling part of the fuselage of the vehicle, so that their legs 205 point downwards (i.e., towards the ceiling panel). The equipment mounting device 100 can then be installed (through an opening of the removed ceiling panel) by lifting it, until it can be coupled to the legs 205 of the installation rails 200.

The equipment housings 11, 12 are illustrated in FIG. 3 as being attached on the same side of the equipment mounting device 100. It is to be noted that one or both of the equipment housings 11, 12 may be attached to the equipment mounting device 100 on an opposite side of the longitudinal carrier 110 (e.g., on the bottom side of longitudinal carrier 110 in FIG. 3). Furthermore, one or both of the equipment housings 11, 12 may also be attached to a side face of the longitudinal carrier 110.

The equipment housing 12 may be configured to house one or more devices, such as an electrical component, a sensor, a control component, etc. The equipment housing 12 may be mounted to one equipment mounting device 100. Alternatively, the equipment housing 12 may be mounted to multiple equipment mounting devices 100. Furthermore, the equipment housing 11 can be a cable channel that extends along the longitudinal direction of the installation rails (perpendicular to the drawing plane of FIG. 3). Such equipment housing 11 would then be required to be mounted to a plurality of equipment mounting devices 100 to the same installation rails 200 or multiple installation rails 200 following the path of the cable channel.

As illustrated in FIG. 3, the equipment mounting device 100 is coupled with a first installation rail 201 employing a first coupling means 120. The first coupling means 120 is disposed at a first end of the longitudinal carrier 110 and is configured to be coupled with a pin 301 extending from the first installation rail 201. The pin 301 may be mounted to the first installation rail 201 using a bushing 310 inserted into an opening 210 of one leg 205 of the first installation rail 201. The pin 301 is inserted into the bushing 310. The first coupling means 120 may include an opening through which pin 301 fits. Alternatively, the pin 301 can be integrally formed with or be otherwise affixed to the first installation rail 201. Furthermore, the pin 301 can be a lug or similar element protruding from a surface of the first installation rail 201.

Also alternatively, the pin 301 can be mounted to the opening 121 in the first coupling means 120 or the pin 301 is integrally formed with the first coupling means 120. The first coupling means 120 can then be coupled to the first installation rail 201 by inserting the pin 301 into the opening 210 of the first installation rail 201.

It is to be understood that the first coupling means 120 may also be formed as illustrated in FIG. 1E as explained above.

An opposite end of the longitudinal carrier 110 is provided with a second coupling means 130 structured as illustrated in FIGS. 1A-D. The second coupling means 130 is capable of receiving a part of a second fitting, e.g., a second installation rail 202, and, in particular, receiving a leg 205 of the second fitting (installation rail 202). The second coupling means 130 can be brought over leg 205 to such an extent that the lug 133 engages with an opening 210 of the leg 205 of the second installation rail 202.

Figure 4A:
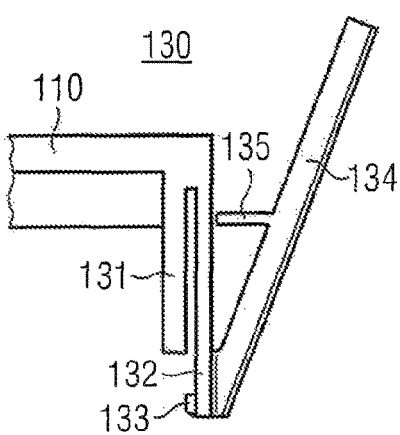
FIGS. 4A and 4B show sectional views of a second coupling means in a coupled state and a decoupling state, FIGS. 5A 5A', 5B and 5C show a perspective view of a second coupling means as well as a partly cut open second coupling means, a side view of a fitting with a cut open second coupling means, and a sectional view of the fitting, respectively.
Figure 4B:
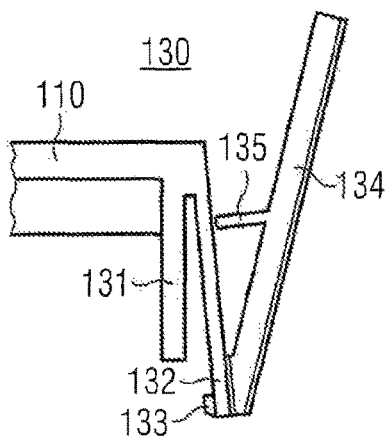

This is illustrated in more detail in FIGS. 4A and 4B. In detail, FIG. 4A illustrates the second coupling means 130 in a "normal" state, i.e., a state where the second coupling means 130 is either fully coupled to the second installation rail 202 or not engaged at all (i.e., in a resting state). In this normal state the first protruding part 131 and second protruding part 132 of the second coupling means 130 can run substantially parallel to each other. The second coupling means 130 includes a lever 134 configured for bending the second protruding part 132. The lever 134 as illustrated in FIG. 4 extends from a distal end of the second protruding part 132 and includes a strut 135 that is configured to contact the second coupling means 130 at or near a proximal end of the second protruding part 132.

If a force is applied onto the distal end of the lever 134 (the upper end of lever 134 in FIGS. 4A-B) or at least above strut 135, the contacting point of the strut 135 with the second protruding part 132 creates a pivotal point of the lever 134. The application of such force onto lever 134 bends the second protruding part 132 away from the first protruding part 131. This bent state is illustrated in FIG. 4B.

A lug or tongue 133 is disposed at the distal end of the second protruding part 132. This lug protrudes from the second protruding part 132 towards or in the direction of the first protruding part 131. As is illustrated in FIG. 3, the lug 133 can engage with an opening 210 in leg 205 of the second installation rail 202.

Alternatively, the second protruding part 132 includes an opening, recess, bore or hole (not shown) instead of the lug 133. Correspondingly, the second installation rail 202 includes a protrusion or lug 220 (illustrated in FIG. 5B) on a surface of the leg 205 facing the second protruding part 132. When coupling the second coupling means 130 to the second installation rail 202, the second coupling means 130 is brought over the leg 205 to such an extent that the opening, recess, bore or hole of the second protruding part 132 encompasses the protrusion or lug 220 of the second installation rail 202.

Again, with respect to FIG. 3, in order to mount the equipment mounting device 100 to the installation rails 200, the first coupling means 120 is coupled to the first installation rail 201, e.g., by moving the first coupling means 120 with its opening 121 over pin 301 or by inserting a pin 301 at the first coupling means 120 into an opening 210 of the first installation rail 201. Subsequently, the second coupling means 130 can be coupled to the second installation rail 202. To this end, the second protruding part 132 may be brought into the bent state by applying a respective force onto the lever 134. This opens the space between the first and second protruding parts 131, 132 and moves the lug 133 (or opening) away from the first protruding part 131. This provides for easy pivoting of the equipment mounting device 100 towards the second installation rail 202, so that the leg 205 of the second installation rail 202 is received in the second coupling means 130, and, in particular, in between the first and second protruding parts 131, 132.

After releasing the lever 134, the lug 133 can engage with the opening 210 in leg 205 of the second installation rail 202 or an opening in the second protruding part can encompass a lug of the second installation rail 202. Thus, the second coupling means 130 converts from the bent state as illustrated in FIG. 4B to the normal state illustrated in FIG. 4A. In the latter state, the equipment mounting device 110 is fixedly coupled with the installation rails 200. On the one side, the first coupling means 120 is capable of transferring loads and forces from the equipment mounting device 100 to the first installation rail 201 in a plane perpendicular (or at an angle) to the longitudinal axis of the longitudinal carrier 110, e.g., vertically in FIG. 3 and perpendicular to a drawing plane of FIG. 3. The first coupling means 120 prevent movement of the longitudinal carrier 110 in at least a first direction different from a direction along or parallel to a longitudinal axis of the longitudinal carrier 110.

On the other side, the second coupling means 130 is capable of transferring loads and forces at least in a direction parallel to the longitudinal direction of the longitudinal carrier 110 from the equipment mounting device 100 to the second installation rail 202. The coupling means 130 prevents movement of the longitudinal carrier 110 at least in the first direction different from the direction along or parallel to the longitudinal axis of the longitudinal carrier and in the direction of the longitudinal axis of the longitudinal carrier. Depending on the degree of engagement of lug 133 in opening 210, also loads and forces in a plane parallel to the extending direction of the first and second protruding parts 131 and 132 may be transferred. In addition, the second coupling means 130 can further be capable of transferring a momentum from the equipment mounting device 100 to the second installation rail 202 via the contacting surfaces of the first and second protruding parts 131, 132 with the outer surfaces of leg 205 of the second installation rail 202.

Figure 5A:
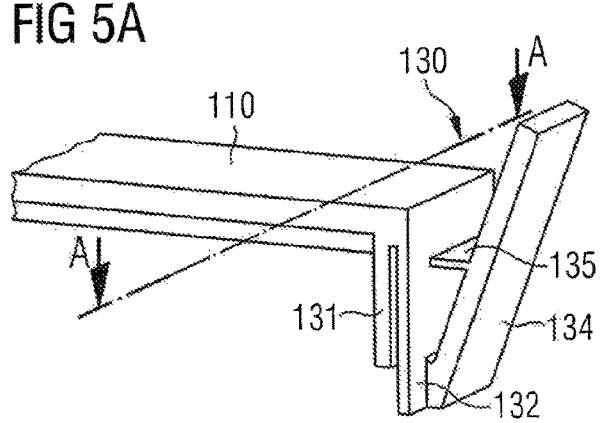
Figure 5A:
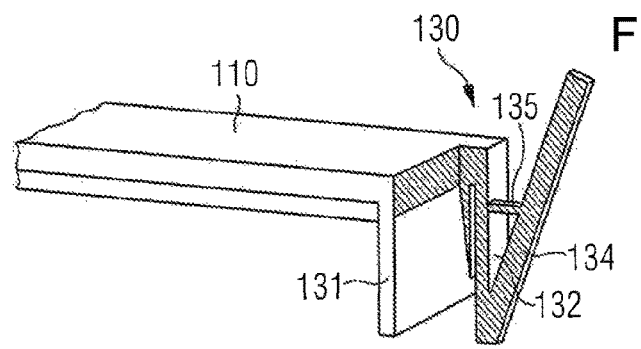
Figure 5C:
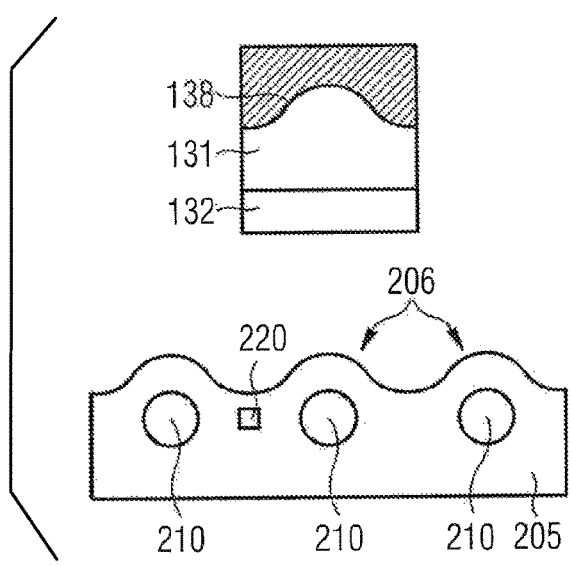
Figure 5C:
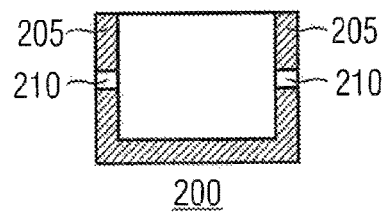

The transfer of loads and forces by the second coupling means 130 can be increased by providing the leg 205 of the second installation rail 202 with an external form mating with the interior form of the second coupling means 130 between the first and second protruding parts 131, 132. Such mating forms are illustrated in FIGS. 5A-C. In detail, FIG. 5A shows a perspective view of the second coupling means 130 and in FIG. 5A' the same second coupling means 130 cut open. FIG. 5B shows a cross-section along the line A-A through the second coupling means 130 of FIG. 5A and a side view of a leg 205 of the second installation rail 202. FIG. 5C illustrates a cross-section of the installation rail 200, and, in particular, the second installation rail 202.

As illustrated in FIG. 5B, the leg 205 of the second installation rail 202 has a scalloping profile 206. The distal end of the leg 205 has a varying height, i.e., the leg 205 has a varying length, along the longitudinal direction of the second installation rail 202. The inner form 138 of the second coupling means 130 has a corresponding profile as can be derived from the sectional view (A-A) of the second coupling means 130 shown in the upper part of FIG. 5B. In order to transfer forces and loads from the second coupling means 130 into the second installation rail 202 in a longitudinal direction of the second installation rail 202, the scalloping profile 206 provides a maximum height of leg 205 above an opening 210 as illustrated in the lower part of FIG. 5B. Thus, the second coupling means 130, and, in particular, the interior form 138, has a dome-like shape receiving the highest part of the scalloping profile 206 substantially in the center of the cross-section of the second coupling means 130. Since the lug 133 will engage into opening 210 or the opening, recess, bore or hole (not shown) of the second protruding part 132 encompasses the protrusion or lug 220 of the second installation rail 202, the second coupling means 130 is affixed to the second installation rail 202 along the longitudinal direction of the second installation rail 202 (to the left and right in FIG. 5B). It is to be understood that a single fitting can have a similar form. For example, a single fitting could be like a cut-out of the installation rail 200 illustrated in the lower portion of FIG. 5B including only one of the openings 210 or only one lug 220. Such single fitting can have a length (in the right-left-direction in FIG. 5B) from one minimum of the height to the next (including one opening 210) or from one maximum of the height to the next (including one lug 220).

Figure 6A:
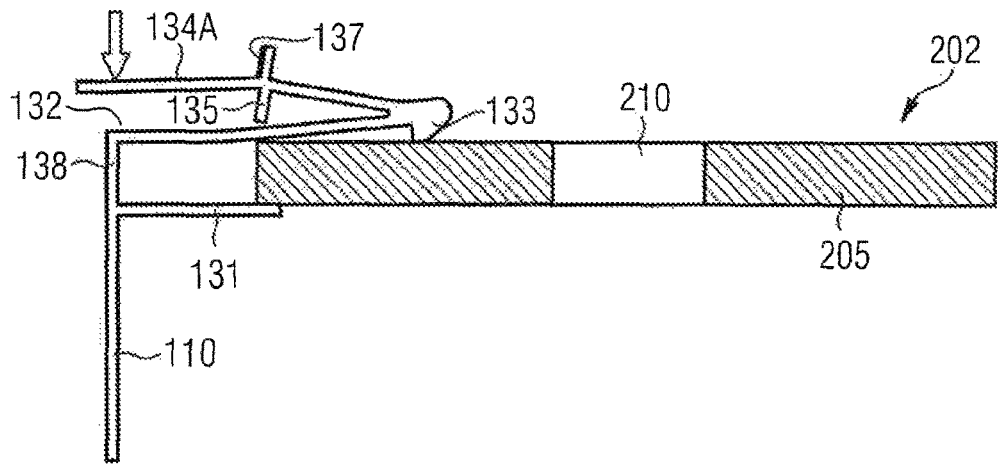
FIGS. 6A to 6C show sectional views of a second coupling means at different states during coupling the second coupling means to a fitting.
Figure 6B:
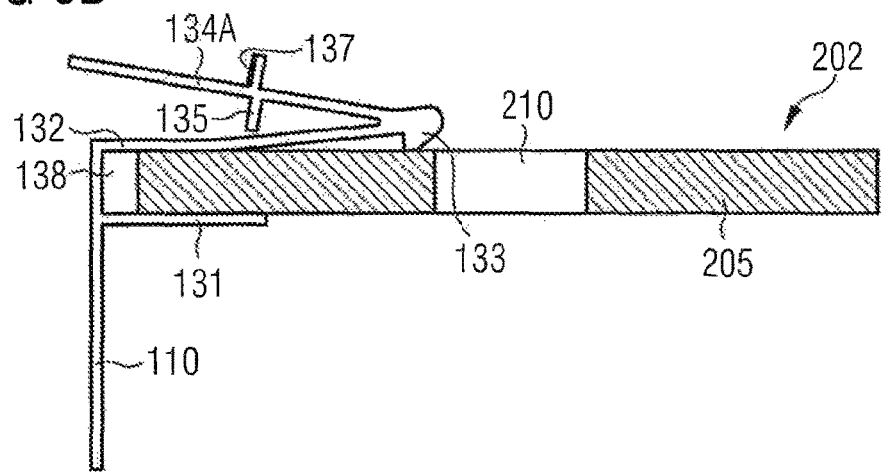
Figure 6C:
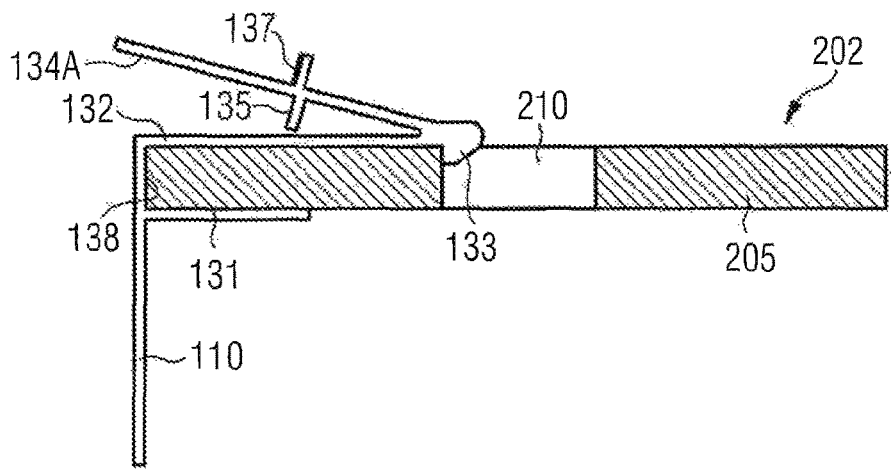

FIGS. 6A to 6C show sectional views of a second coupling means 130 at different states during coupling the second coupling means 130 to the second fitting, e.g. the second installation rail 202 in more detail. In the state illustrated in FIG. 6A the second protruding part 132 is bent away from the first protruding part 131 by applying a force (illustrated as an arrow) onto a distal end of lever 134A. This allows receiving the leg 205 of the second installation rail 202 in between the first and second protruding parts 131, 132. At this time the lug 133 is also bent away for an easy reception of the leg 205. According to FIGS. 6B, the leg 205 is inserted to a certain degree into the space between first and second protruding parts 131, 132. The external force does not need to be applied to the lever 134A anymore. Instead, the lug 133 (still) abuts against a side surface of the leg 205, thereby bending the second protruding part 132 as well as the lever 134A.

FIGS. 6A-C exemplarily illustrate a visual indicator 137 provided at lever 134A. The visual indicator 137 can indicate that the lug 133 is not engaged into the opening 210 of the second installation rail 202. The line of sight is assumed from left to right in FIGS. 6A-C. When the lever 134A is bent, either by the applied force illustrated in FIG. 6A or since the lug 133 abuts against the side surface of leg 205 thereby bending the second protruding part 132 and the lever 134A as illustrated in FIG. 6B, the visual indicator 137 can be seen.

When the second coupling means 130 is further engaged with the leg 205 of the second installation rail 202, the lug 133 can snap into the opening 210 of the leg 205 as illustrated in FIG. 6C. At this time, the front end of the leg 205 may abut against an interior form 138 of the second coupling means 130. Due to the engagement of the lug 133 with the opening 210 of the second installation rail 202, the second protruding part 132 as well as the lever 134A will move back into the normal state of the second coupling means 130.

At this time, the lever 134A, and, in particular, its distal end, moves upwards in FIG. 6. Thereby, the lever 134A covers the sight to visual indicator 137. For example, visual indicator 137 may be a colored strut extending from the lever 134A. At least the side of the indicator 137 visible from the outside of the second coupling means 130 when mounted to the second installation rail 202 is colored. For example, the indicator 137 may be colored red and/or has a fluorescent coating. As long as the indicator 137 can be seen, it indicates that the lug 133 does not engage with the opening 210. At the time the indicator 137 is not visible, e.g., due to the lever 134A covering it, it is indicated to the user that the lug has engaged with the opening 210.

Figure 7A:
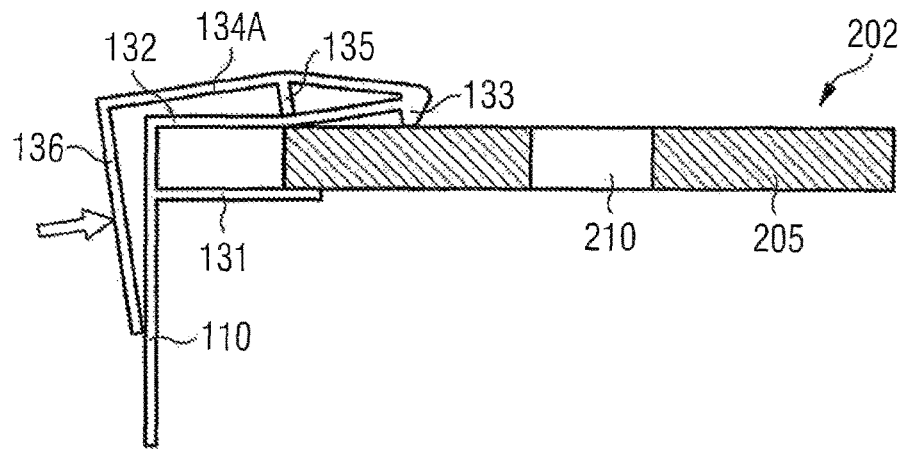
FIGS. 7A to 7C show sectional views of another second coupling means at different states during coupling the second coupling means to a fitting.
Figure 7B:
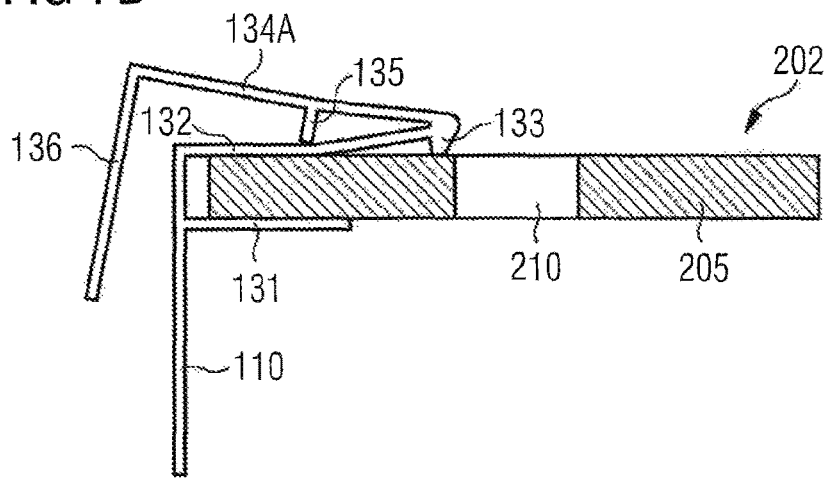
Figure 7C:
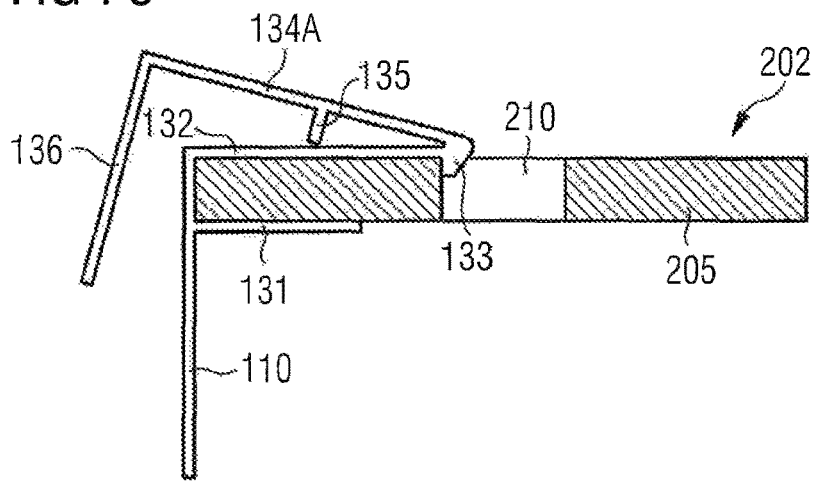

A similar arrangement of the second coupling means 130 is illustrated in FIGS. 7A-C. A repeating explanation of identical or very similar elements of the second coupling means 130 and their functionality during engagement of the second coupling means 130 with the second fitting, e.g., the second installation rail 202 that were already explained with respect to FIGS. 6A-C will be omitted.

The lever 134A, according to the implementation variant of FIGS. 7A-C, includes a bend 136. The bend 136 allows bending the second protruding part 132 via lever 134A even in the case, where a force cannot be applied onto the lever 134A as illustrated in FIG. 6A. As can be derived from a comparison of FIGS. 6A and 7A, the lug 133 and the second protruding part 132 can be bent away from a side surface of the leg 205 (upwardly in FIGS. 6A-C and 7A-C) by applying a force on to the bend 136. This force is perpendicular to the force to be applied onto the lever 134A, if the bend 136 is arranged perpendicular to lever 134A.

It is to be understood, that the bend 136 can be arranged at any angle with respect to the lever 134A. Furthermore, the bend 136 can also be provided into the other direction (upwardly in FIG. 7). In the latter case the bend 136 has to be pulled, i.e., a force opposite to the one illustrated in FIG. 7A has to be applied onto the bend 136, in order to move the lug 133 away from the leg 205 and the first protruding part 131.

Figure 8A:
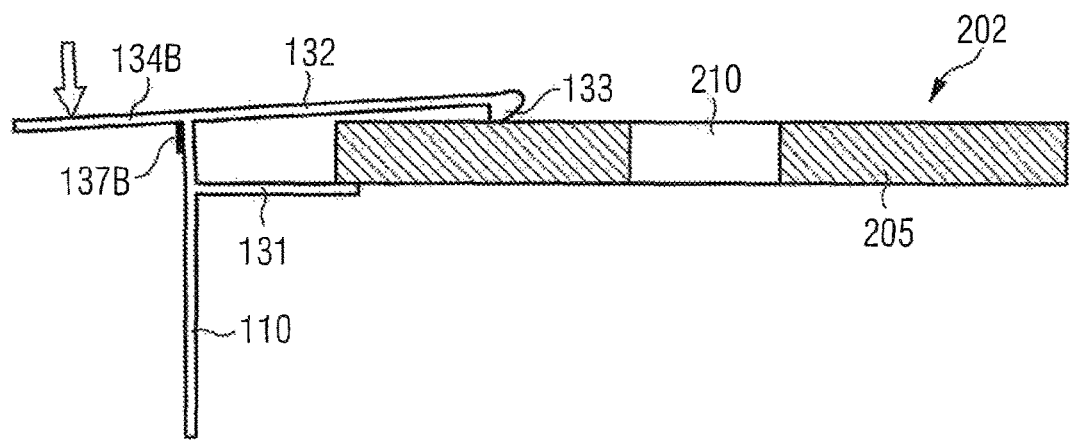
FIGS. 8A and 8B show sectional views of yet another second coupling means at different states during coupling the second coupling means to a fitting.
Figure 8B:
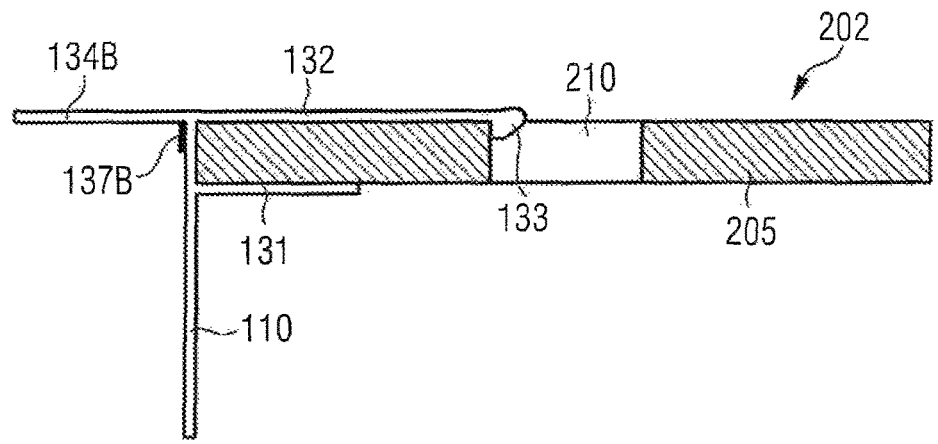

Another implementation variant of the lever 134 is illustrated in FIGS. 8A-B. Here the lever 134B extends from a proximal end of the second protruding part 132. While this form of lever 134B saves space next to the second protruding part 132 (above protruding part 132 in FIG. 8A), the lever 134B extends further away from the longitudinal carrier 110 (to the left in FIG. 8A) in order to achieve a similar lever arm as with lever 134A illustrated in FIGS. 6A-C or FIGS. 7A-C.

FIGS. 8A and 8B again illustrate a bent state of the second coupling means 130 and a normal (engaged) state of the second coupling means 130, respectively. The second coupling means 130 according to FIGS. 8A-B can also be provided with a visual indicator 137B indicating that the lug 133 is engaged into the opening 210 of the second installation rail 202. For example, the visual indicator 137B could be provided at a corner between lever 134B and a portion of the second coupling means 130 prolonging the longitudinal carrier 110. In this case, the visual indicator 137B will be covered by the lever 134B as long as the lug 133 does not engage with opening 210.

Alternatively, the lug 133 may be provided with a visual indicator (not shown). In particular, the lug 133 may be formed, so that it pierces (extends fully) through the opening 210. A tip of the lug 133 could then be provided with the visual indicator, such as a colored area, that can be seen from the outside when protruding part of the opening 210. Such visual indicator can be provided with any of the described second coupling means variants 130, such as those illustrated in FIGS. 4A-B and 6A-C to 8A-B.

It is to be understood that each coupling illustrated in FIGS. 6A-C to 8A-B is also applicable for the alternative form of the second coupling means 130 having an opening and the second fitting (second installation rail 202) having a lug. According to this alternative, the second protruding part 132 has to bend away from the second installation rail 202, so that the opening in the second protruding part 132 can move over the lug on the second installation rail 202. If the opening in the second protruding part 132 encompasses the lug on the second installation rail 202, the second protruding part can achieve the "normal" state (resting state).

FIG. 9 shows a sectional view of the first coupling means 120 and a pin arrangement at the first fitting, e.g., the first installation rail 201. It is to be understood that the pin arrangement can be replaced by a structure including a different structural component, such as a bolt, strut, etc., allowing movement of the longitudinal carrier 110 in its longitudinal direction and preventing movement in at least one direction different from the longitudinal direction. The first installation rail 201 is provided with an opening 210 at at least one of its legs 205. At least one of the openings 210 is prepared with a bushing 310 that can be inserted into the opening 210. The bushing 310 is formed so as to hold within the opening 210.

A pin 301 is then inserted into the bushing 310, so that it is held by the bushing 310 and extends towards the second installation rail 202. The pin 301 is dimensioned so that it extends far enough from leg 205 and bushing 310, so that it allows the first coupling means 120 to be put on the pin 301. Thus, the length of the extending part of the pin 301 can be at least the thickness of the first coupling means 120, e.g., the wall thickness of the first coupling means 120 at opening 121.

It is further to be understood that the bushing 310 can alternatively be inserted into the opening 121 in the first coupling means 120. In this case the pin 310 is inserted into the bushing 310 in the first coupling means 120 and can be received by the opening 210 in the first installation rail 201.

In order to firmly hold the pin 301 in the bushing 310 and the bushing 310 in the opening 210, the bushing 310 includes a securing element 313, 314. This is illustrated in more detail in FIG. 10A. The bushing 310 can be of a cylindrical shape, the outer appearance corresponding to the inner appearance of opening 210. For example, if the opening is a circular opening 210, the bushing 310 has a circular outer circumference. Likewise, if the opening 210 has a rectangular shape, the bushing 310 has also a rectangular outer circumference.

The bushing 310 can be made of an elastic material allowing the bushing 310 a certain degree of elastic deformation when being inserted into the opening 210 of the first installation rail 201 or inserted into the opening 121 of the first coupling means 120. In order to hold inside the opening 210/121, the bushing 310 is provided with a circumferential recess 311. Thus, when inserted into the opening 210/121, the bushing is hold to the side surfaces of the leg 205 or the side surface of the first coupling means 120 with respective parts of the bushing on opposite sides of the recess 311. A conical outer shape of the bushing 310 (see FIG. 10A) facilitates insertion of the bushing 310 into the opening 210/121.

The bushing 310 further includes a through hole 312 having a cross-sectional shape corresponding to a first part 303 of the pin 301. This facilitates inserting the pin 301, i.e., at least the first part 303, into the bushing 310. The through hole 312 of the bushing 310 can alternatively be of a conical shape, e.g., tapering towards the lower end in FIG. 10A. When the pin 301 is inserted into such bushing 310, the bushing will be squeezed to the outside, thereby securing the bushing 310 inside the opening 210/121.

The pin 301 further includes a second part 302 that extends from the first part 303. The second part 302 provides for coupling with the first coupling means 120 or for coupling with the first installation rail 201. The first part 303 and the second part 302 may have different sizes. For example, the size and cross-sectional shape of the first part 303 of the pin 301 correspond to the size and form of the through hole 312 of the bushing 310, while the size and cross-sectional shape of the second part 302 of the pin 301 correspond to the size and shape of the opening 121/210.

The pin 301 can optionally include a disc-shaped part 305 between the first part 303 and the second part 302. This disc-shaped part 305 can abut against one side of the bushing 310. Thereby, the second part 302 can extend from the bushing 310 and, hence, from the leg 205 or the first coupling means 120 with a predefined distance (the length of the second part 302).

Furthermore, the pin 301 can be provided with an activator 304, e.g., a circumferentially arranged ridge or bulge 304 on the first part 303. The activator 304 can be arranged on an outer surface of the first part 303, for example at a predefined distance to disc-shaped part 305, to correspond with a first part 313 of the securing element 313, 314 of the bushing 310. For example, the securing element 313, 314 of the bushing 310 comprises a bushing part 314 that abuts against a side surface of the leg 205 or a side surface of the first coupling means 120 and a circumferentially arranged recess or groove 313 provided in the through hole 312 at the bushing part 314. The bushing part 314 may form a cone 314 that facilitates inserting the bushing 310 into the opening 210.

When the pin 301 is inserted into the through hole 312, the activator 304 can engage with the recess or groove 313. The activator (ridge or bulge) 304 can be bigger than the recess or groove 313, i.e., extends further from the first part 303 then the recess or groove 313 extends into the bushing part 314. Due to the elastic material of the bushing 310, the bushing part 314 is pressed to the outside by activator 304. This provides a squeezing force onto the bushing part 314, which prevents the bushing 310 from decoupling with the opening 210/121. Due to the pin 301 being arranged inside the bushing 310, the bushing cannot elastically deform to be decoupled from the opening 210/121.

FIG. 10B shows a sequence of installing the bushing 310 and the pin 301 to the first installation rail 201. The sequence is illustrated from left to right in FIG. 10B. First the leg 205, the bushing 310 and the pin 301 are illustrated separately from each other. Subsequently, the bushing 310 is inserted into the opening 210 of the leg 205 of the first installation rail 201. In particular, the bushing 310 is inserted into the opening 201 so that the recess 311 of the bushing 310 engages with the leg 205 at the opening 210. Next, the pin 301 is inserted into the through hole 312 of the bushing 310. The insertion is stopped when the disc-shaped part 305 abuts against the bushing 310. Thereby, the activator 304 of the pin 301 will engage with the recess or groove 313 of the bushing 310. Thus, the bushing 310 and the pin 301 are firmly hold in the opening 210 of the first installation rail 201.

It is to be understood that the same insertion sequence applies, if the bushing and pin are inserted into the opening 121 of the first coupling means 120.

The above described aspects, variants and implementations of an equipment mounting device and installation arrangement do not limit the present disclosure. Any details described with respect to one of illustrated equipment mounting devices, fittings (installation rails) and equipment housings may also be implemented or applied to another one of the described equipment mounting devices, fittings (installation rails) and equipment housings.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 10 installation arrangement
11 equipment housing
12 equipment housing
100 equipment mounting device
110 longitudinal carrier
120 first coupling means
121 opening/hole in first coupling means
125 variant of first coupling means
130 second coupling means
131 first protruding part
132 second protruding part
133 lug
134 lever
135 strut
136 bend
137 visual indicator
138 interior form
200 fitting (e.g., installation rail)
201 first fitting (installation rail)
202 second fitting (installation rail)
205 leg
206 exterior form (scalloping profile)
210 opening in leg 205
211 variant of opening in leg 205
212 variant of opening in leg 205
213 variant of opening in leg 205
301 pin
302 second part of pin
303 first part of pin
304 activator (circular bulge)
305 disc-shaped part of pin
310 bushing
311 recess
312 through hole
313 securing element (groove)
314 securing element (cone)

The invention claimed is:

1. An equipment mounting device for mounting an equipment to two fittings in a vehicle, the equipment mounting device comprising:
a longitudinal carrier configured to be coupled to the equipment and sized to span a space between the two fittings;
a first coupling disposed at a first end of the longitudinal carrier, the first coupling configured to be coupled with a first fitting of the two fittings and, when coupled with the first fitting, to prevent movement of the longitudinal carrier in a first direction different from a direction along a longitudinal axis of the longitudinal carrier; and
a second coupling configured to detachably couple with a second fitting of the two fittings by receiving a part of the second fitting and, when coupled with the second fitting, to prevent movement of the longitudinal carrier at least in the first direction and the direction of the longitudinal axis of the longitudinal carrier,
wherein the second coupling includes a first protruding part protruding from the longitudinal carrier at an angle with respect to the longitudinal axis of the longitudinal carrier, and a second protruding part forming a clip, wherein the second coupling is configured to receive the part of the second fitting between the first protruding part and the second protruding part,
wherein the second protruding part includes a lug configured for engaging into an opening of the second fitting or wherein the second protruding part includes an opening that is configured to encompass a lug of the second fitting,
wherein the second coupling includes a lever configured for bending the second protruding part to disengage the lug from the opening of the second fitting or to disengage the opening in the second protruding part from the lug of the second fitting,
wherein the lever extends from a distal end of the second protruding part and forms an acute angle with the second protruding part, wherein the lever includes a strut extending outwardly from the lever towards a portion of the second coupling forming the acute angle with the lever, the strut configured to provide a pivotal point of the lever by contacting a surface upon an actuating force applied to the lever.

2. The equipment mounting device according to claim 1, wherein the strut is configured to contact the second protruding part at or near a proximal end of the second protruding part to create the pivotal point of the lever.

3. The equipment mounting device according to claim 1, wherein the lever includes a bend.

4. The equipment mounting device according to claim 1, wherein the second protruding part includes a visual indicator indicating that the lug is not engaged in the opening of the second fitting or that the opening in the second protruding part does not encompass the lug of the second fitting.

5. The equipment mounting device according to claim 1, wherein the second coupling has an interior form matching an exterior form of the part of the second fitting received by the second coupling.

6. The equipment mounting device according to claim 1, wherein the first coupling includes a plug-and-socket connection.

7. The equipment mounting device according to claim 6, wherein the plug-and-socket connection includes a pin coupled with at least one of an opening in the first fitting or an opening in the first coupling.

8. An installation arrangement for a vehicle, the installation arrangement comprising:
- at least two fittings;
- an equipment housing; and
- at least one equipment mounting device according to claim 1, wherein each equipment mounting device is coupled to the equipment housing and is coupled to a respective pair of fittings of the at least two fittings at respective ends of the equipment mounting device.

9. The installation arrangement according to claim 8, wherein at least one of the at least two fittings is an installation rail.

10. The installation arrangement according to claim 8, wherein a part of at least one of the fittings has a scalloping profile matching an interior form of the second coupling of the equipment mounting device.

11. The installation arrangement according to claim 8, further comprising:
- a bushing inserted into an opening of one of the fittings; and
- a pin inserted into the bushing,
- wherein the at least one equipment mounting device is coupled to the pin at one end of the at least one equipment mounting device.

12. The installation arrangement according to claim 8, further comprising:
- a bushing inserted into an opening of the first coupling of the equipment mounting device; and
- a pin inserted into the bushing,
- wherein the at least one equipment mounting device is coupled to one of the fittings by inserting the pin into an opening in the one fitting.

* * * * *